US006566767B1

(12) United States Patent
Tardo

(10) Patent No.: US 6,566,767 B1
(45) Date of Patent: May 20, 2003

(54) SELECTABLE MAKE-BRAKE GROUND CONNECTOR, CABLE AND/OR SYSTEM

(75) Inventor: Timothy Bryan Tardo, Collinsville, MS (US)

(73) Assignee: Peavey Electronics Corporation, Meridian, MI (US)

( * ) Notice: Subject to any disclaimer, the term of this patent is extended or adjusted under 35 U.S.C. 154(b) by 163 days.

(21) Appl. No.: 09/758,711

(22) Filed: Jan. 11, 2001

(51) Int. Cl.[7] .................................................. H04B 15/00

(52) U.S. Cl. ........................... 307/89; 381/124; 381/77; 200/51.03; 200/51.05; 200/51.11

(58) Field of Search ....................... 307/89, 85; 381/77, 381/124; 200/51.03, 51.05, 51.11

(56) References Cited

U.S. PATENT DOCUMENTS 4,876,520 A * 10/1989 Kjosness et al. .............. 333/12

OTHER PUBLICATIONS

Rane Corporation, RaneNote Technical Bulletin, 1995, "Sound System Interconnection", no month.

* cited by examiner

*Primary Examiner*—Brian Sircus
*Assistant Examiner*—Robert L DeBeradinis
(74) *Attorney, Agent, or Firm*—Lerner, David, Littenberg, Krumholz & Mentlik, LLP

(57) ABSTRACT

A signal cable includes a first connector having at least one signal lead and a ground lead, and being operable to couple to a first mating connector of a first piece of electronic equipment; a second connector having at least one signal lead and a ground lead, and being operable to couple to a second mating connector of a second piece of electronic equipment; at least one signal wire and a ground wire electrically connecting the respective at least one signal leads and the respective ground leads of the first and second connectors; and at least one switch disposed with at least one of the first and second connectors, the at least one switch having selectable make/break contacts coupled between the ground lead and the ground wire of the at least one of the first and second connectors such that an electrical path between the ground leads of the first and second connectors may be selectively opened and closed.

24 Claims, 4 Drawing Sheets

SELECTABLE MAKE-BRAKE GROUND CONNECTOR, CABLE AND/OR SYSTEM

BACKGROUND OF THE INVENTION

The present invention relates to cable interconnection between electronic equipment and, more particularly, to a connector and/or cable capable of selectively opening or closing a ground connection between two pieces of electronic equipment.

Noise problems often occur when undesirable ground loops are produced. Such ground loops are often formed when multiple pieces of electronic equipment are connected to one another through cables. To illustrate this problem, reference is made to FIG. 1, which shows a first piece of electronic equipment 10 connected to a second piece of electronic equipment 20 by way of a cable 30. The cable 30 includes a first connector 32 and a second connector 34 that are operable to mate with the first piece of electronic equipment 10 and the second piece of electronic equipment 20, respectively. The cable 30 also includes signal wires 36*a*, 36*b* and a ground wire 36*c* for electrically connecting respective signal and ground leads 12, 14, 16 of the first piece of electronic equipment 10 to signal and ground leads 22, 24, 26 of the second piece of electronic equipment 20. The first piece of electronic equipment 10 includes a connection from earth ground 1 to ground lead 16 (and/or chassis). Similarly, the second piece of electronic equipment 20 includes a connection from earth ground 2 to ground lead 26 (and/or chassis).

An undesirable ground loop may be produced when the cable 30 electrically connects the ground lead 16 of the first piece of electronic equipment 10 to the ground lead 26 of the second piece of electronic equipment 20. This is so because the respective earth grounds 1, 2 of the first and second pieces of electronic equipment 10, 20, respectively, are not at precisely the same potential as a function of time. Thus, noise currents flow between the earth grounds 1, 2 by way of the ground wire 36*c* of the cable 30. The connections to the respective earth grounds 1, 2 are often made by way of respective AC power cords and chassis connections for the first and second pieces of electronic equipment 10, 20. Consequently, the noise currents are often in the audible range, for example, 60 Hz, 120 Hz, 180 Hz, etc. (often referred to as "hum").

With reference to FIG. 2, the ground loop problem illustrated in FIG. 1 may be solved by replacing the first piece of electronic equipment 10 with a piece of electronic equipment 40 that includes a switch 42 that is operable to interrupt the electrical path between the earth ground 1 and the ground lead 16. Unfortunately, very few pieces of electronic equipment include such a switch 42. When a piece of electronic equipment includes such a switch 42, it often is a very high-end unit with a correspondingly high purchase price. Consequently, users often opt for the electronic equipment 10, 20 of FIG. 1 and either live with the undesirable hum or take other, less advantageous, approaches to eliminating the noise currents. For example, users may attempt to disconnect the earth ground 1 from, for example, the first piece of electronic equipment 10 by removing the earth ground terminal from the AC power cord or utilizing a three-prong to two-prong adapter (often called a "cheater"), which performs the same function. In either case, the chassis of the first piece of electronic equipment 10 will float with respect to earth ground 1 and, therefore, present an electrical shock hazard to those handling the first piece of electronic equipment 10.

With reference to FIG. 3, it is noted that a cable 50 may include a connector 52 having a switch 58 coupled between signal leads 54, 56. In order to achieve a mute condition, a user may connect leads 54, 56 together by way of the switch 58 (thereby shorting any differential signal from reaching the second piece of electronic equipment 20). The muting switch 58, however, does not solve the ground loop problem between earth grounds 1, 2.

Accordingly, there is a need in the art for a connector and/or cable that can effectively eliminate ground loop noise problems while still maintaining one or more signal connections between equipment.

SUMMARY OF THE INVENTION

In accordance with at least one aspect of the present invention, a signal cable includes: a first connector having at least one signal lead and a ground lead, and being operable to couple to a first mating connector of a first piece of electronic equipment; a second connector having at least one signal lead and a ground lead, and being operable to couple to a second mating connector of a second piece of electronic equipment; at least one signal wire and a ground wire electrically connecting the respective at least one signal leads and the respective ground leads of the first and second connectors; and at least one switch disposed with at least one of the first and second connectors, the at least one switch having selectable make/break contacts coupled between the ground lead and the ground wire of the at least one of the first and second connectors such that an electrical path between the ground leads of the first and second connectors may be selectively opened and closed.

Preferably, the first and second mating connectors of the first and second pieces of electronic equipment each include at least one mating signal lead and a mating ground lead for connection to the respective at least one signal lead and ground lead of one of the first and second connectors; the mating ground leads are electrically connected to respective chassis grounds of the first and second pieces of electronic equipment; and the at least one switch is operable to selectively open and close an electrical path between the chassis grounds of the first and second pieces of electronic equipment.

In accordance with at least one further aspect of the present invention, a connector operable to couple to a mating connector of a piece of electronic equipment includes: at least one signal lead and a ground lead operable to electrically connect to at least one signal wire and a ground wire, respectively, of a cable; and at least one switch having selectable make/break contacts, one of the make/break contacts being electrically connected to the ground lead and the other make/break contact being operable to electrically connect to the ground wire of the cable such that an electrical path between the ground lead and the ground wire may be selectively opened and closed.

In accordance with at least one further aspect of the present invention, a system includes: a first piece of electronic equipment having a first mating connector that includes at least one mating signal lead and a mating ground lead, the ground lead being electrically connected to a chassis ground of the first piece of electronic equipment; a second piece of electronic equipment having a second mating connector that includes at least one mating signal lead and a mating ground lead, the ground lead being electrically connected to a chassis ground of the second piece of electronic equipment; and a signal cable including: a first connector having at least one signal lead and a ground lead, and being operable to couple to the first mating connector of the first piece of electronic equipment; a second connector having at least one signal lead and a ground lead, and being operable to couple to the second mating connector of the second piece of electronic equipment; at least one signal wire and a ground wire electrically connecting the respective at least one signal leads and the respective ground leads of the first and second connectors; and at least one switch disposed with at least one of the first and second connectors, the at least one switch having selectable make/break contacts coupled between the ground lead and the ground wire of the at least one of the first and second connectors such that an electrical path between the chassis grounds of the first and second pieces of electronic equipment may be selectively opened and closed.

In accordance with at least one further aspect of the invention, a connector operable to couple between a mating connector of a piece of electronic equipment and a mating connector of a cable, includes: a first end having at least one signal lead and a ground lead operable to electrically connect to at least one mating signal lead and a mating ground lead, respectively, of the mating connector of the piece of electronic equipment; a second end having at least one signal lead and a ground lead operable to electrically connect to at least one signal wire and a ground wire, respectively, of the mating connector of the cable; and at least one switch having selectable make/break contacts, one of the make/break contacts being electrically connected to the ground lead of the first end and the other make/break contact being operable to electrically connect to the ground lead of the second end such that an electrical path between the ground leads may be selectively opened and closed.

Other aspects, uses and advantages of the present invention will be apparent to one skilled in the art based on the disclosure herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
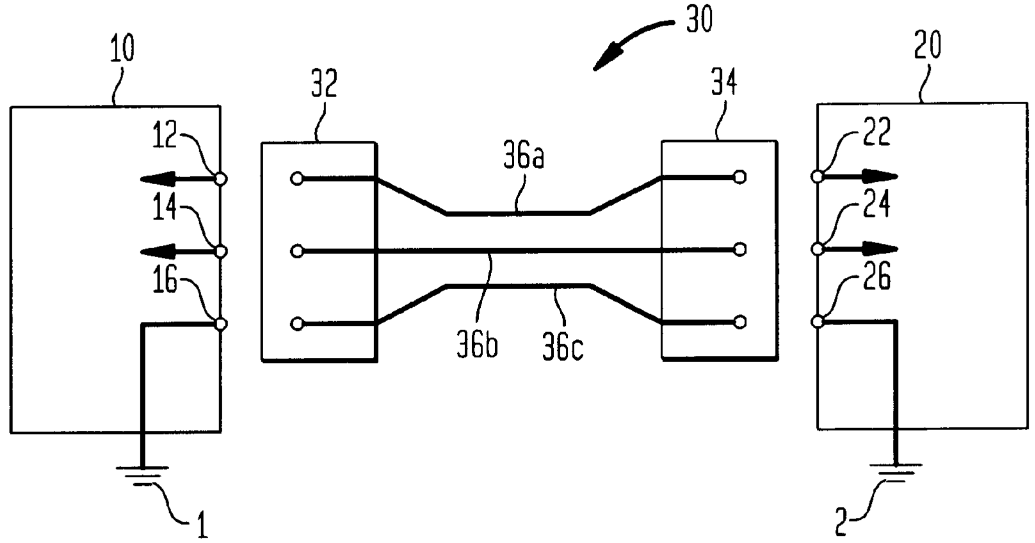
FIG. 1 (PRIOR ART)
FIG. 1 is a schematic diagram illustrating the interconnection of two pieces of electronic equipment in accordance with a technique of the prior art.
Figure 2:
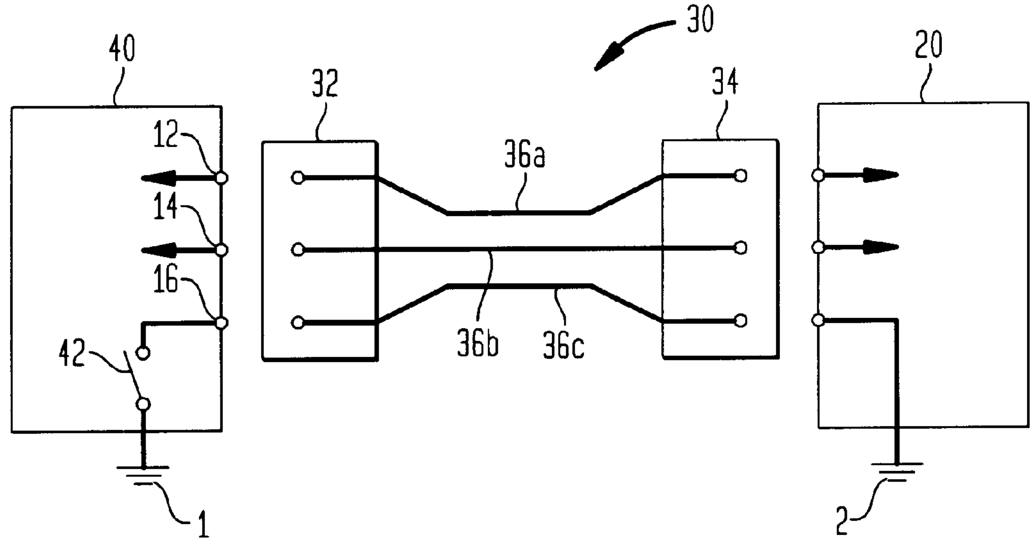
FIG. 2 (PRIOR ART)
FIG. 2 is a schematic diagram showing the interconnection of two pieces of electronic equipment in accordance with another technique of the prior art.
Figure 3:
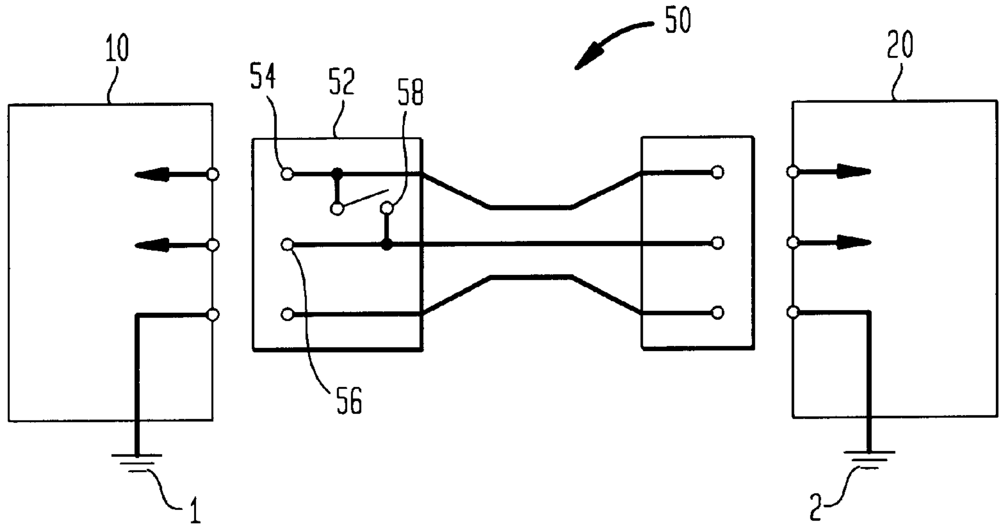
FIG. 3 (PRIOR ART)
FIG. 3 is a schematic diagram illustrating the interconnection of two pieces of electronic equipment in accordance with still another technique of the prior art.
Figure 4:
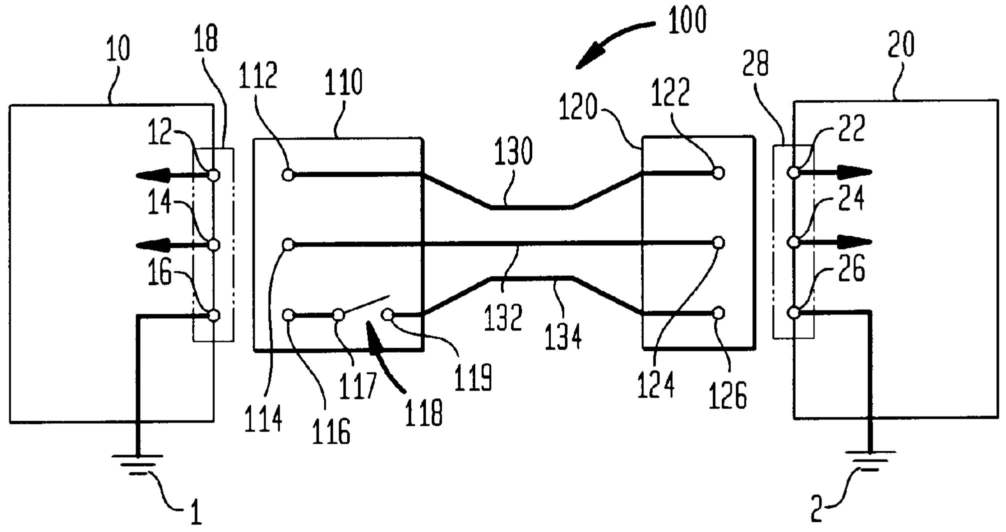
FIG. 4 is a schematic diagram of the interconnection of two pieces of electronic equipment in accordance with at least one aspect of the present invention.

Referring now to the drawings wherein like numerals indicate like elements, there is shown in FIG. 4 a schematic diagram illustrating the interconnection of a first piece of electronic equipment 10 and a second piece of electronic equipment 20 utilizing a cable 100 in accordance with at least one aspect of the present invention. The cable 100 includes a first connector 110 and a second connector 120 at respective ends of signal wires 130, 132, and ground wire 134. The first connector 110 preferably includes a first signal lead 112, a second signal lead 114, and a ground lead 116 as would be used, for example, in a balanced connector (such as an XLR connector) The first connector 110 is preferably operable to couple to a mating connector 18 of the first piece of electronic equipment 10 such that the first signal lead 112 of the first connector 110 engages a first signal lead 12 of the mating connector 18. Similarly, the second signal lead 114 of the first connector 110 preferably engages a second signal lead 14 of the mating connector 18. Finally, the ground lead 116 of the first connector 110 preferably engages a ground lead 16 of the mating connector 18. The second connector 120 preferably includes a similar configuration as the first connector 110 inasmuch as a balanced arrangement is contemplated, where the second connector 120 is preferably operable to couple to a mating connector 28 of the second piece of electronic equipment.

Preferably, a signal wire 130 electrically connects the first signal lead 112 of the first connector 110 to the signal lead 122 of the second connector 120. It is preferred a second signal wire 132 electrically connects the second signal lead 114 of the first connector 110 to the second signal lead 124 of the second connector 120. It is also preferred that a ground wire 134 electrically connects the ground lead 116 of the first connector 110 to the ground lead 126 of the second connector 120. The ground wire 134 may be a shield for one or more of the signal wires 130, 132. Further, the ground wire 134 may be electrically connected to respective shells of the first and second connectors 110, 120.

The first connector 110 preferably includes at least one switch 118 having selectable make/break contacts 117, 119 coupled between the ground lead 116 and the ground wire 134. The switch 118 is preferably activated by a user when he or she wishes to interrupt the electrical path between the ground leads 116, 126 of the first and second connectors 110, 120. When the ground leads 16, 26 of the first and second pieces of electronic equipment 10, 20 are connected to the earth grounds 1, 2, respectively, the user may selectively open and close the electrical path therebetween. Advantageously, a ground connection (e.g., chassis ground) between the first and second pieces of electronic equipment 10, 20 may be opened without severing the connection between the chassis of the first piece of electronic equipment 10 and earth ground 1 or the connection between the chassis of the second piece of electronic equipment 20 and the earth ground 2. Thus, a ground loop may be interrupted without creating a shock hazard to users of the equipment.

The one or more aspects of the present invention as illustrated in FIG. 4 may be implemented using any suitable connector 110, including but not limited to, XLR connectors, RCA connectors, BNC connectors, TNC connectors, ⅛ inch connectors, and ¼ inch connectors.

Figure 5:
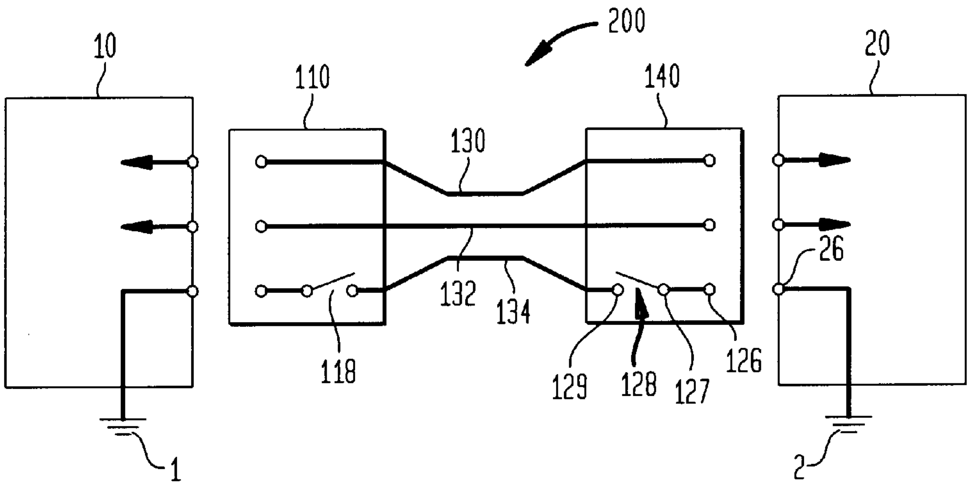
FIG. 5 is a schematic diagram of the interconnection of two pieces of electronic equipment in accordance with at least one further aspect of the present invention.

With reference to FIG. 5, at least one other aspect of the present invention provides for utilizing at least one switch 118 in the first connector 110 and at least one second switch 128 disposed in a second connector 140. Selectable make/ break contacts 127, 129 of the second switch 128 are preferably coupled between the ground lead 126 and the ground wire 134, thereby providing an additional place at which the electrical path between earth grounds 1, 2 may be interrupted.

Figure 6:
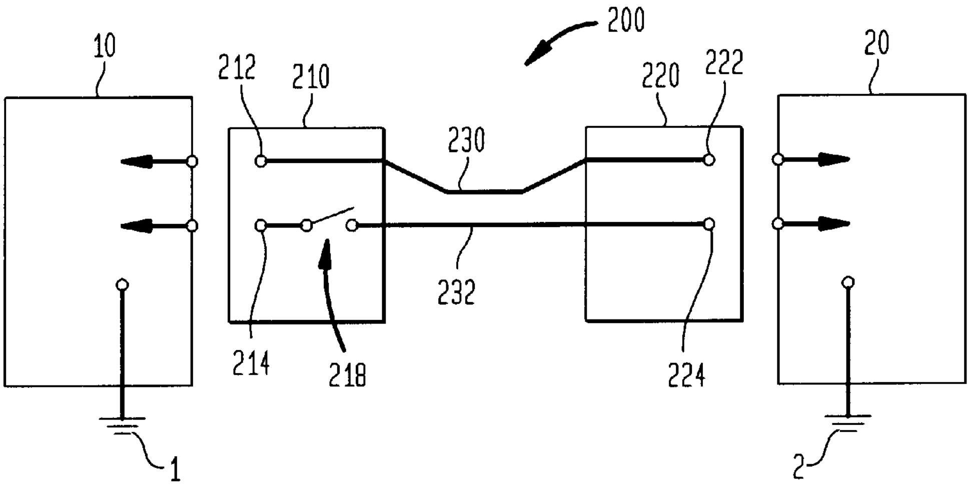
FIG. 6 is a schematic diagram of the interconnection of two pieces of electronic equipment in accordance with at least one still further aspect of the present invention.

With reference to FIG. 6, in accordance with one or more further aspects of the present invention, undesirable ground loops may be compensated for when unbalanced interconnections are utilized (such as by way of RCA connectors). In particular, a cable 200 preferably includes a first connector 210, a second connector 220 and first and second signal wires 230, 232. For the purposes of the unbalanced interconnection, the signal on the second signal wire 232 may be considered a return or ground with respect to the signal on the first signal wire 230. The first signal wire 230 preferably electrically connects a first signal lead 212 of the first connector 210 and a first signal lead 222 of the second connector 220. The second signal (or ground) wire 232 preferably electrically connects a second signal lead 214 of the first connector 210 and a second signal lead 224 of the second connector 220. The first connector 210 preferably includes at least one switch 218 coupled between the second signal lead 214 and the second signal wire 232 such that the electrical path therebetween may be opened and closed in accordance with the desires of the user. It has been found that opening this electrical path does not mute the signal on the first signal wire 130 and, thus, the primary function of the cable 200 (e.g., delivering a signal from the first piece of electronic equipment 10 to the second piece of electronic equipment 20) is not disturbed. Opening this electrical path, however, has been found to yield desirable reductions in noise propagation, reduced hum, etc. It is noted that at least one other switch (not shown) may be disposed with the second connector 220 without departing from the spirit or scope of the invention.

Advantageously, certain ground, return and/or signal connections between the first and second pieces of electronic equipment 10, 20 may be opened without severing the connection between the chassis of the first piece of electronic equipment 10 and earth ground 1 or the connection between the chassis of the second piece of electronic equipment 20 and the earth ground 2. Thus, a ground loop may be interrupted without creating a shock hazard to users of the equipment. Further, expensive and/or high-end equipment (which may be difficult to obtain) that includes internal ground interruption switches need not be employed.

Figure 7:
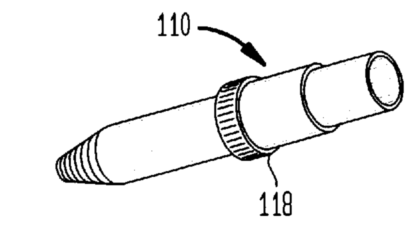
FIG. 7 is a perspective view of a connector suitable for use in accordance with at least one aspect of the present invention.

By way of example, FIG. 7 illustrates a suitable XLR connector 110 having a switch 118 that the user can selectively activate to open and/or close the electrical path between lead 116 and a corresponding wire (not shown).

Figure 8:
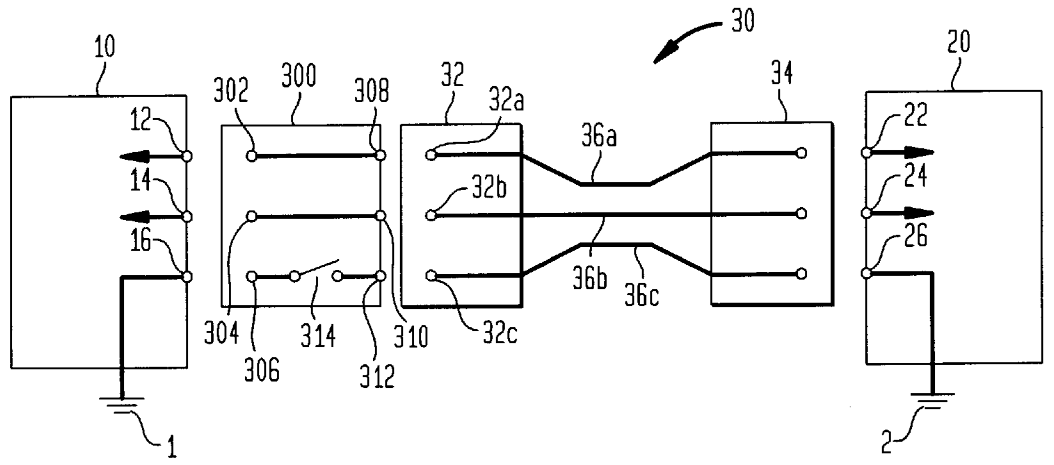
FIG. 8 is a schematic diagram of the interconnection of two pieces of electronic equipment in accordance with at least one still further aspect of the present invention.

Referring now to FIG. 8, a schematic diagram illustrating the interconnection of a first piece of electronic equipment 10 and a second piece of electronic equipment 20 utilizing a conventional cable 30 and a connector 300 in accordance with at least one aspect of the present invention is shown. The connector 300 includes a first end preferably having a first signal lead 302, a second signal lead 304, and a ground lead 306, it being understood that any number of signal and/or ground leads are contemplated without departing from the scope of the present invention. The connector 300 also preferably includes a second end having a first signal lead 308, a second signal lead 310, and a ground lead 312 corresponding to the respective leads of the first end. The connector 300 is preferably operable to couple to a mating connector of the first piece of electronic equipment 10 such that the first signal lead 302 of the connector 300 engages a first signal lead 12 of the mating connector of the first piece of electronic equipment 10. Similarly, the second signal lead 304 of the connector 300 preferably engages a second signal lead 14 of the mating connector. Finally, the ground lead 306 of the connector 300 preferably engages a ground lead 16 of the mating connector. The second end of the connector 300 is preferably operable to engage a connector 32 of the cable 30 such that the first signal lead 308, second signal lead 310, and ground lead 312 engage corresponding first signal lead 32A, second signal lead 32B, and ground lead 32C of the cable 30. The interconnection of the cable 30 to the second piece of electronic equipment 20 is in keeping with the disclosure hereinabove.

The connector 300 preferably includes at least one switch 314 having selectable make/break contacts coupled between the ground leads 306, 312 of the first and second ends of the connector, respectively. The switch 314 is preferably activated by a user when he or she wishes to interrupt the electrical path between the ground lead 16 of the first piece of electronic equipment 10 and the ground lead 32C of the cable 30. The user may selectively open and close the electrical path between ground leads 16, 26 of the first and second pieces of electronic equipment 10, 20 and, therefore, selectively open and close the electrical path between the earth grounds 1, 2, respectively. Advantageously, a ground connection between the first and second pieces of electronic equipment 10, 20 may be opened by way of connector 300 even when a conventional cable 30 is employed. Although not shown in figures, the connector 300 may be interposed between cable connector 34 and the second piece of electronic equipment 20. Alternatively, the connector 300 may be disposed as shown in FIG. 8 and a second connector (similar to that of connector 300) may be interposed between cable connector 34 and the second piece of electronic equipment 20 such that two switches are available for interrupting the ground interconnection between the first and second pieces of electronic equipment 10, 20.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A signal cable, comprising:

a first connector having at least one signal lead and a ground lead, and being operable to couple to a first mating connector of a first piece of electronic equipment;

a second connector having at least one signal lead and a ground lead, and being operable to couple to a second mating connector of a second piece of electronic equipment;

at least one signal wire and a ground wire electrically connecting the respective at least one signal leads and the respective ground leads of the first and second connectors; and at least one switch disposed with at least one of the first and second connectors, the at least one switch having selectable make/break contacts coupled between the ground lead and the ground wire of the at least one of the first and second connectors such that an electrical path between the ground leads of the first and second connectors may be selectively opened and closed.

2. The signal cable of claim 1, wherein:

the first and second mating connectors of the first and second pieces of electronic equipment each include at least one mating signal lead and a mating ground lead for connection to the respective at least one signal lead and ground lead of one of the first and second connectors;

the mating ground leads are electrically connected to respective earth grounds of the first and second pieces of electronic equipment; and the at least one switch is operable to selectively open and close an electrical path between the earth grounds of the first and second pieces of electronic equipment.

3. The signal cable of claim 1, wherein one such switch is disposed with one of the first and second connectors such that the electrical path between the ground leads of the first and second connectors may be selectively opened and closed.

4. The signal cable of claim 1, wherein the ground wire is a shield for the at least one signal wire.

5. The signal cable of claim 1, wherein the first connector includes first and second signal leads; the second connector includes first and second signal leads; and first and second signal wires electrically connect the respective first and second signal leads.

6. The signal cable of claim 1, wherein the first and second connectors each include a shell and the ground leads are electrically connected to the respective shells.

7. The signal cable of claim 1, wherein the first and second connectors are taken from the group consisting of XLR connectors, RCA connectors, BNC connectors, TNC connectors, ⅛ inch connectors, and ¼ inch connectors.

8. A connector operable to couple to a mating connector of a piece of electronic equipment, comprising:

at least one signal lead and a ground lead operable to electrically connect to at least one signal wire and a ground wire, respectively, of a cable; and at least one switch having selectable make/break contacts, one of the make/break contacts being electrically connected to the ground lead and the other make/break contact being operable to electrically connect to the ground wire of the cable such that an electrical path between the ground lead and the ground wire may be selectively opened and closed.

9. The connector of claim 8, wherein:

the mating connector of the piece of electronic equipment includes at least one mating signal lead and a mating ground lead for connection to the respective at least one signal lead and ground lead;

the mating ground lead is electrically connected to an earth ground of the piece of electronic equipment; and the at least one switch is operable to selectively open and close an electrical path between the earth ground of the piece of electronic equipment and the ground wire of the cable.

10. The connector of claim 8, wherein the ground wire is a shield for the first and second signal wires.

11. The connector of claim 8, wherein the connector includes a shell and the ground lead is electrically connected to the shell.

12. The connector of claim 8, wherein the connector includes first and second signal leads operable to electrically connect to first and second signal wires of the cable.

13. The connector of claim 8, wherein the connector is taken from the group consisting of an XLR connector, an RCA connector, a BNC connector, a TNC connector, an ⅛ inch connector, and a ¼ inch connector.

14. A system, comprising:

a first piece of electronic equipment having a first mating connector that includes at least one mating signal lead and a mating ground lead, the ground lead being electrically connected to an earth ground of the first piece of electronic equipment;

a second piece of electronic equipment having a second mating connector that includes at least one mating signal lead and a mating ground lead, the ground lead being electrically connected to an earth ground of the second piece of electronic equipment; and a signal cable including:

a first connector having at least one signal lead and a ground lead, and being operable to couple to the first mating connector of the first piece of electronic equipment;

a second connector having at least one signal lead and a ground lead, and being operable to couple to the second mating connector of the second piece of electronic equipment;

at least one signal wire and a ground wire electrically connecting the respective at least one signal leads and the respective ground leads of the first and second connectors; and at least one switch disposed with at least one of the first and second connectors, the at least one switch having selectable make/break contacts coupled between the ground lead and the ground wire of the at least one of the first and second connectors such that an electrical path between the earth grounds of the first and second pieces of electronic equipment may be selectively opened and closed.

15. The system of claim 14, wherein one such switch is disposed with one of the first and second connectors such that the electrical path between the ground leads of the first and second connectors may be selectively opened and closed.

16. The system of claim 14, wherein the ground wire is a shield for the at least one signal wire.

17. The system of claim 14, wherein the first connector includes first and second signal leads; the second connector includes first and second signal leads; and first and second signal wires electrically connect the respective first and second signal leads.

18. The system of claim 14, wherein the first and second connectors each include a shell and the ground leads are electrically connected to the respective shells.

19. The system of claim 14, wherein the first and second connectors are taken from the group consisting of XLR connectors, RCA connectors, BNC connectors, TNC connectors, ⅛ inch connectors, and ¼ inch connectors.

20. A connector operable to couple between a mating connector of a piece of electronic equipment and a mating connector of a cable, comprising:

a first end having at least one signal lead and a ground lead operable to electrically connect to at least one mating signal lead and a mating ground lead, respectively, of the mating connector of the piece of electronic equipment;

a second end having at least one signal lead and a ground lead operable to electrically connect to at least one signal wire and a ground wire, respectively, of the mating connector of the cable; and at least one switch having selectable make/break contacts, one of the make/break contacts being electrically connected to the ground lead of the first end and the other make/break contact being operable to electrically connect to the ground lead of the second end such that an electrical path between the ground leads may be selectively opened and closed.

21. The connector of claim 20, wherein:

the mating ground lead of the piece of electronic equipment is electrically connected to an earth ground of the piece of electronic equipment; and the at least one switch is operable to selectively open and close an electrical path between the earth ground of the piece of electronic equipment and the ground wire of the cable.

22. The connector of claim 20, wherein the first end of the connector includes first and second signal leads operable to electrically connect to mating first and second signal leads of the piece of electronic equipment and the second end of the connector includes first and second signal leads operable to electrically connect to first and second signal wires of the mating connector of the cable.

23. The connector of claim 20, wherein the connector is taken from the group consisting of an XLR connector, an RCA connector, a BNC connector, a TNC connector, an ⅛ inch connector, and a ¼ inch connector.

24. A connector operable to couple to a mating connector of a piece of electronic equipment, comprising:

at least one signal lead and a ground lead operable to electrically connect to at least one signal wire and a ground wire, respectively, of a cable; and at least one switch having selectable make/break contacts, one of the make/break contacts being electrically connected to the ground lead and the other make/break contact being operable to electrically connect to the ground wire of the cable such that an electrical path between the ground lead and the ground wire may be selectively opened and closed, without affecting any connections between the at least one signal wire and the respective at least one signal lead.

* * * * *

UNITED STATES PATENT AND TRADEMARK OFFICE

CERTIFICATE OF CORRECTION

PATENT NO. : 6,566,767 B1
DATED : May 20, 2003
INVENTOR(S) : Timothy Bryan Tardo It is certified that error appears in the above-identified patent and that said Letters Patent is hereby corrected as shown below:

Title page,
Item [73], Assignee, "Meridian, MI" should read -- Meridian, MS --.

Signed and Sealed this

Twenty-first Day of October, 2003

JAMES E. ROGAN
*Director of the United States Patent and Trademark Office*